United States Patent
Vaidyanathan et al.

(10) Patent No.: US 12,433,674 B2
(45) Date of Patent: Oct. 7, 2025

(54) COOLING FLUID FLOW RATE MONITORING FOR LASER INTERSTITIAL THERMAL THERAPY

(71) Applicant: Medtronic Navigation, Inc., Lafayette, CO (US)

(72) Inventors: Janardan Vaidyanathan, Thane-West (IN); Rebecca Vincelette, Louisville, CO (US); Drew Wilson, Boulder, CO (US); Christine Drown, Louisville, CO (US); Marco Capote, Louisville, CO (US); Shawn Santana, Louisville, CO (US)

(73) Assignee: Medtronic Navigation, Inc., Lafayette, CO (US)

( * ) Notice: Subject to any disclaimer, the term of this patent is extended or adjusted under 35 U.S.C. 154(b) by 402 days.

(21) Appl. No.: 17/929,971

(22) Filed: Sep. 6, 2022

(65) Prior Publication Data

US 2023/0121330 A1  Apr. 20, 2023

Related U.S. Application Data

(60) Provisional application No. 63/366,007, filed on Jun. 7, 2022, provisional application No. 63/255,642, filed on Oct. 14, 2021.

(51) Int. Cl.
*A61B 18/20* (2006.01)
*A61B 18/00* (2006.01)
*A61B 18/24* (2006.01)

(52) U.S. Cl.
CPC .... *A61B 18/20* (2013.01); *A61B 2018/00577* (2013.01); *A61B 2018/00791* (2013.01)

(58) Field of Classification Search
CPC .......... A61B 18/20; A61B 2018/00577; A61B 2018/00791
See application file for complete search history.

(56) References Cited

U.S. PATENT DOCUMENTS 9,956,040 B1  5/2018  Lastarria
10,188,849 B2 *  1/2019  Fangrow .............. A61J 1/1475
(Continued)

FOREIGN PATENT DOCUMENTS

WO  WO 2020/018722  1/2020

OTHER PUBLICATIONS

Official Action for U.S. Appl. No. 17/929,969, dated Sep. 23, 2024, 6 pages Restriction Requirement.
(Continued)

*Primary Examiner* — Benjamin J Klein
*Assistant Examiner* — Thien Jason Tran
(74) *Attorney, Agent, or Firm* — Sheridan Ross P.C.

(57) ABSTRACT

Devices, systems, and methods to verify a magnetic field phase drift and to check for proper function of a laser fiber cooling system during laser ablation therapy are disclosed. The laser fiber cooling system includes a cooling catheter insertable into laser ablation target tissue, a coupling assembly to define fluid channels, inflow and outflow ports, a fluid pump to pump fluid through the laser fiber cooling system, a fluid source, a first sensor to measure an inflow fluid parameter, a second sensor to measure an outflow fluid parameter, and a processor. Methods of verifying and checking include measuring the fluid parameter, comparing the inflow and outflow parameter measurements to determine a comparison value, comparing the comparison value to a tolerance range, and signaling a user when the comparison value is outside of the tolerance range.

20 Claims, 6 Drawing Sheets

(56) References Cited

U.S. PATENT DOCUMENTS

| | | |
|---|---|---|
| 10,390,882 B2 * | 8/2019 | Brannan ................ A61B 90/06 |
| 2014/0128861 A1 | 5/2014 | Leung et al. |
| 2017/0319276 A1 | 11/2017 | Brannan |
| 2019/0029756 A1 * | 1/2019 | Natarajan ............ A61B 5/0036 |
| 2019/0125443 A1 | 5/2019 | Prakash et al. |
| 2023/0117619 A1 | 4/2023 | Vaidyanathan |

OTHER PUBLICATIONS

Official Action for U.S. Appl. No. 17/929,969, dated Jan. 31, 2025, 12 pages.
Official Action for U.S. Appl. No. 17/929,969, dated Jul. 2, 2025 9 pages.

* cited by examiner

COOLING FLUID FLOW RATE MONITORING FOR LASER INTERSTITIAL THERMAL THERAPY

RELATED APPLICATIONS

This application claims priority benefit of U.S. Provisional Patent Application No. 63/366,007, filed Jun. 7, 2022; and U.S. Provisional Patent Application No. 63/255,642, filed Oct. 14, 2021, both of which are hereby incorporated by reference in their entireties.

TECHNICAL FIELD

The present disclosure relates generally to devices, systems, and methods used to treat a patient's tissue. More specifically, the present disclosure relates to devices, systems, and methods used to verify phase drift and check proper cooling system operation during a laser ablation procedure.

BACKGROUND INFORMATION

Laser ablation therapy, such as Laser Interstitial Thermal Therapy (LITT), is a technique for treating various tumors in the liver, the brain, the abdomen, and/or other regions of the body, as well as for treating benign lesions, such as prostate adenomas. In some therapies, a laser probe is inserted into a desired region (e.g., tumor) of treatment to deliver laser energy. After positioning the laser probe, laser energy may be emitted interstitially to irradiate target tissue and generate heat that leads to thermal tissue necrosis. Thus, LITT may be used to ablate a tumor via thermal energy generated from the laser energy while limiting side effects or additional damage to surrounding structures.

SUMMARY OF THE DISCLOSURE

Disclosed in an Example 1 is a laser fiber cooling monitoring system, comprising: a first sensor to measure a parameter of a fluid within an inflow channel of a laser fiber cooling system; a second sensor to measure the parameter of the fluid within an outflow channel of a laser fiber cooling system; wherein either one or both of the first sensor and the second sensor are break-beam sensors configured to count drops in corresponding drip chambers; and a processor to: receive inflow data and outflow data from, respectively, the first sensor and the second sensor, compare the inflow data to the outflow data to determine a parameter comparison value, and notify a user when the parameter comparison value is outside a tolerance range.

Example 2. The laser fiber cooling monitoring system of Example 1, wherein the parameter is a fluid flow rate.

Example 3. The laser fiber cooling monitoring system of claim 1, wherein the parameter comparison value is a difference between, or a ratio of, an inflow fluid flow rate and an outflow fluid flow rate.

Example 4. The laser fiber cooling monitoring system of claim 1, wherein the parameter comparison value is used to indicate a fluid flow restriction or malfunction of the laser fiber cooling system when the parameter comparison value is outside the tolerance range.

Example 5. The laser fiber cooling monitoring system of claim 1, wherein the tolerance range is greater than 0.1 milliliters per minute.

Example 6. The laser fiber cooling monitoring system of claim 1, wherein the first sensor is a break-beam sensor configured to count drops in an inflow drip chamber.

Example 7. The laser fiber cooling monitoring system of claim 1, wherein the second sensor is a break-beam sensor configured to count drops in an outflow drip chamber.

Example 8. The laser fiber cooling monitoring system of claim 1 including the laser fiber cooling system, the laser fiber cooling system further comprising: a cooling catheter; a fluid source containing the fluid; a fluid flow path comprising the inflow channel that receives the fluid from the fluid source and directs the fluid to the cooling catheter, and an outflow channel that receives the fluid from the cooling catheter.

Example 9. The laser fiber cooling system of claim 8, further comprising a fluid pump configured to pump the fluid from the fluid source into the fluid flow path.

Example 10. The laser fiber cooling system of claim 8, in which the fluid source is an IV bag of saline.

Example 11. The laser fiber cooling monitoring system of claim 1, wherein the first sensor is one or more of a first fluid flow sensor and a first temperature sensor, and wherein the second sensor is one or more of a second fluid flow sensor and a second temperature sensor.

Example 12. The laser fiber cooling monitoring system of claim 1, wherein the processor is configured to control a laser energy source, and wherein the processor is configured to one or more: decrease laser energy output from the laser energy source, increase the laser energy output from the laser energy source, suspend the laser energy output from the laser energy source, or terminate the laser energy output from the laser energy source.

Disclosed in an Example 13 is a method of laser ablation therapy, comprising: initiating fluid flow through a fluid flow path, wherein a laser fiber is in contact with the flowing fluid along a length of the laser fiber; obtaining with a first sensor a first parameter value by measuring a parameter of the fluid prior to contact with the laser fiber; obtaining with a second sensor a second parameter value by measuring the parameter of the fluid after contact with the laser fiber; comparing the first parameter value to the second parameter value to obtain a parameter comparison value; determining if the parameter comparison value is outside a tolerance range; signaling a user when the parameter comparison value is outside the tolerance range; and wherein either one or both of the first sensor and the second sensor are break-beam sensors configured to count drops in corresponding drip chambers.

Example 14. The method of claim 13, further comprising using the parameter comparison value to indicate a flow restriction within the fluid flow path when the parameter comparison value is outside the tolerance range.

Example 15. The method claim 13, wherein the parameter is a fluid flow rate.

Example 16. The method of claim 13, wherein the parameter comparison value is a difference between, or a ratio of, an inflow fluid flow rate and an outflow fluid flow rate.

Example 17. The method of claim 1, wherein the first sensor is a break-beam sensor configured to count drops in an inflow drip chamber.

Example 18. The method of claim 1, wherein the second sensor is a break-beam sensor configured to count drops in an outflow drip chamber.

Example 19. The method of claim 13, further comprising controlling a laser energy source with a processor when the parameter comparison value is outside the tolerance range, wherein the processor is configured to one or more: decrease laser energy output from the laser energy source, increase the laser energy output from the laser energy source, suspend the laser energy output from the laser energy source, or terminate the laser energy output from the laser energy source.

Additional aspects and advantages will be apparent from the following detailed description of embodiments, which proceeds with reference to the accompanying drawings.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION OF EMBODIMENTS

Figure 1:
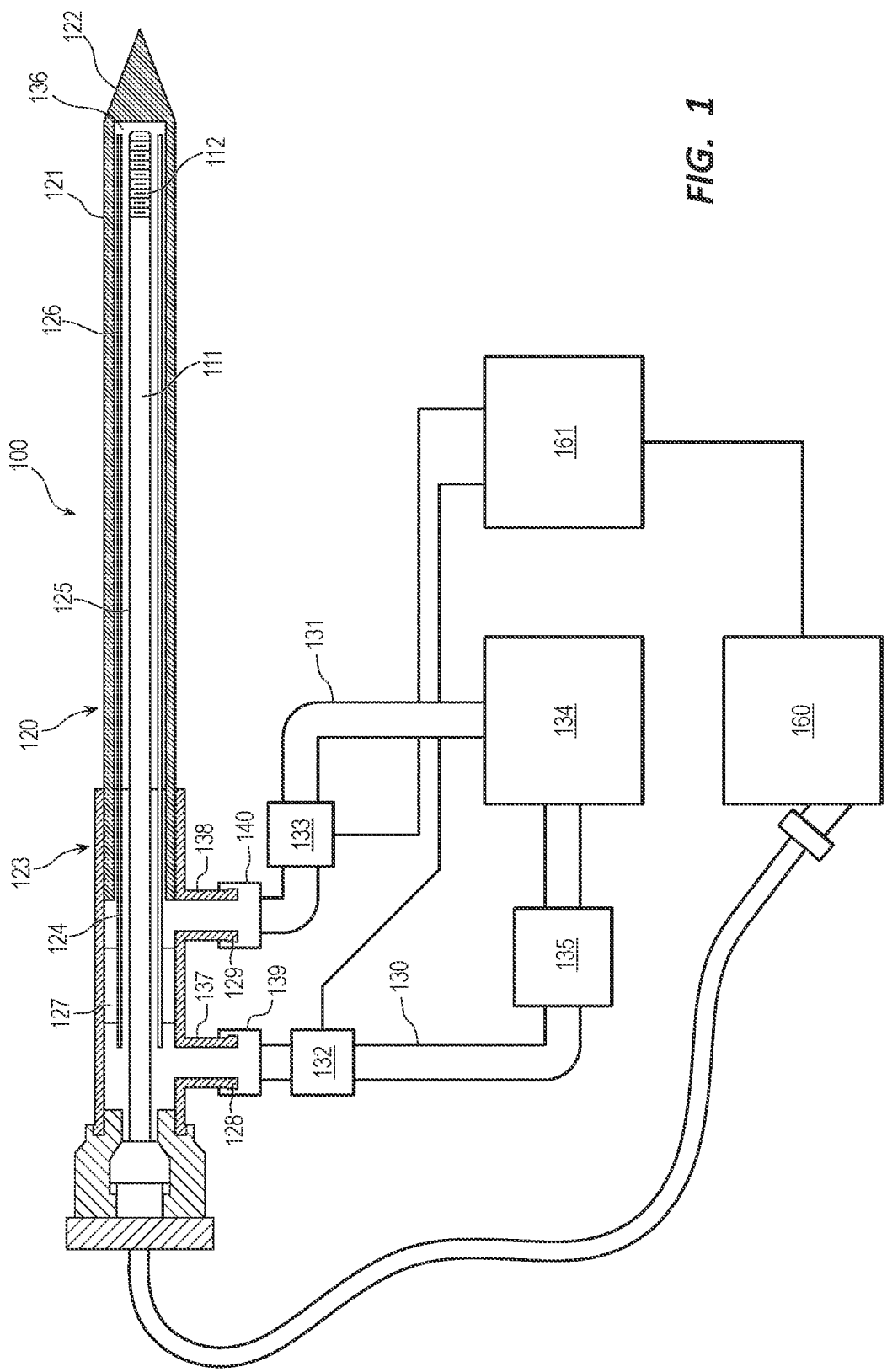
FIG. 1 is a schematic view of an embodiment of a laser fiber cooling system.

In certain instances, LITT utilizes a laser fiber cooling or irrigation system to prevent unintentional hyperthermia of tissue along a trajectory of the laser fiber and destruction of a diffusing tip of a laser fiber. However, in some instances the cooling or irrigation system can malfunction (e.g., kink, occlusion, disconnection, breakage, fluid source depletion, leakage, pump failure, etc.) causing reduction or loss of fluid (also referred to as the coolant or cooling fluid in other instances) flow resulting in hyperthermia of non-diseased tissue or unintentional ablation along the catheter trajectory. Hyperthermia of non-diseased tissue may cause undesired patient morbidities, such as compromising of neural functions, seizures, excessive neural edema, etc. Potential adverse outcomes may include neurological deficits (e.g., focal motor deficits, aphasia, cognitive changes), increased intracerebral edema or pressure, intracranial bleeding, and/or visual changes (e.g., visual field deficits, blurry vision).

In some instances, LITT utilizes and is guided by a magnetic field source for magnetic resonance (MR) thermometry to monitor an inferred temperature of the ablation target tissue. Over the duration of the LITT procedure, the static magnetic field can drift or vary over time resulting in an over or under reporting of the inferred tissue temperature relative to an actual tissue temperature. This non-thermal phase drift can impact the inferred temperature of the ablation target tissue. The over or under reporting of the inferred tissue temperature can potentially result in ablation of non-diseased tissue surrounding the tumor and/or insufficient ablation of diseased tissue of the tumor. It may also lead to inaccurate calculation and presentation of the damage estimate model to the user influencing procedural accuracy and precision. The ablation of non-diseased tissue may cause undesired patient morbidities, such as compromising of neural functions, seizures, excessive neural edema, etc. Insufficient ablation of the diseased tissue may cause other undesired patient morbidities, such as recurrence of the tumor, metastasis of the tumor, death, etc.

Embodiments herein describe systems, methods, and apparatuses to monitor fluid flow and fluid temperature of a laser cooling system. The laser cooling system may include a cooling catheter disposable within the ablation target tissue and into which a laser fiber is disposed. A coupling assembly may be coupled to a proximal end of the cooling catheter. The coupling assembly may include an elongate tubular structure configured to provide two fluid flow channels within the cooling catheter. An inlet port of the coupling assembly is in fluid communication with a first fluid flow channel, and an outlet port of the coupling assembly is in fluid communication with the second fluid flow channel. The laser fiber can be disposed within the first fluid flow channel. Cooling fluid can flow to the inlet port from a cooling fluid source through inflow tubing and return to the cooling fluid source or be discarded through outflow tubing. A fluid pump can be in line with the inflow tubing to pump fluid from the fluid source, through the inflow tubing, inlet port, and first channel and around the laser fiber, second channel, outlet port, and outflow tubing. The laser cooling system may include a first sensor coupled with the inflow tubing and configured to measure a fluid parameter (e.g., flow rate, temperature) of the cooling fluid flowing through the inflow tubing. A second sensor may be coupled with the outflow tubing and configured to measure a fluid parameter of the cooling fluid flowing through the outflow tubing. The sensors may be temperature and/or flow sensors.

In some embodiments, the laser cooling system can be used to check proper fluid flow within the cooling system in real time. The first flow sensor can measure an inflow fluid flow rate from the cooling fluid source, and the second flow sensor can measure an outflow fluid flow rate returning to the cooling fluid source or being discarded through outflow tubing. The inflow fluid flow rate can be compared with the outflow fluid flow rate by a processor to determine a fluid flow rate comparison value. The fluid flow rate comparison value is the difference between or a ratio of the inflow fluid flow rate and the outflow fluid flow rate. If the fluid flow rate comparison value is outside of a tolerance range, the processor can notify the user of a potential malfunction of the laser cooling system. In some embodiments, the tolerance range may be set to be a value between 0.1 to 10 milliliters per minute. For example, if the tolerance range is set to be greater than 0.1 millimeters per minute, a flow rate comparison value greater than 0.1 millimeters per minute would be out of the tolerance range.

In certain embodiments, the laser cooling system can be used to detect and verify an occurrence of a phase drift of the magnetic field during a laser ablation procedure. The first sensor can measure an inflow fluid temperature, and the second sensor can measure an outflow fluid temperature. The inflow fluid temperature can be compared with the outflow fluid temperature by a processor to determine a fluid temperature comparison value. The fluid temperature comparison value can be compared with a fluid temperature tolerance range. The fluid temperature comparison value is the difference between or a ratio of the inflow fluid temperature and the outflow fluid temperature. If the fluid temperature comparison value is outside of the fluid temperature tolerance range, the processor can notify the user of a potential magnetic field phase drift.

In other embodiments, the inflow fluid temperature measured by the first sensor can be compared with a temperature of a static reference marker inferred by MR thermometry. Ratios of the temperature values prior to treatment and during treatment can be compared. If comparison values are outside of a tolerance range, the processor can notify the user of a potential magnetic phase drift.

Within the scope of the disclosure, a phase drift would occur when static reference markers (e.g., on the hemisphere of the brain opposite to the treatment hemisphere) not affected by injected laser energy starts showing a change in an inferred MR thermometry observed temperature value when the treatment is in progress. Treatment is in progress (i.e., when the laser energy is activated) when an outflow fluid temperature exceeds an inflow fluid temperature. If the static temperature reference markers show variability when a temperature invariant phantom (maintained at a constant temperature) stays constant, this too could indicate a phase drift.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

FIGS. 1-4 illustrate different views of laser fiber cooling systems and related methods according to some embodiments. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

As depicted in FIG. 1, a laser fiber cooling system 100 in the illustrated embodiment comprises a cooling catheter 120, a coupling assembly 123, inflow tubing 130, outflow tubing 131, a first sensor 132, a second sensor 133, a cooling fluid source 134, a fluid pump 135, and a processor 161. A distal portion of a laser fiber 111 is disposed within a bore 136 of the cooling catheter 120. A distal end of the laser fiber 111 includes a diffusing tip [e.g., radial or directional) configured to diffuse laser light energy from the laser fiber 111 into surrounding interstitial tissue. A proximal end of the laser fiber 111 is coupled to a laser light source 160 and configured to provide laser light to the laser fiber 111.

As illustrated in FIG. 1, the cooling catheter 120 includes a tubular body 121 surrounding the bore 136 and a penetrating tip 122 coupled to a distal end of the tubular body 121. The cooling catheter 120 is configured to be inserted into a tissue (e.g., tumor) targeted for thermal ablation. The penetrating tip 122 can be of any suitable design to facilitate penetration of tissue. For example, as illustrated in FIG. 1, the penetrating tip 122 can be a pencil point type tip. The distal portion of the laser fiber 111 is slidably positioned within the bore 136 during the laser ablation procedure. A diffusing tip 112 can be positioned adjacent the penetrating tip 122. In some embodiments, the laser fiber 111 may be proximally displaced or pulled back during the laser ablation procedure.

FIG. 1 depicts the coupling assembly 123 coupled to a proximal end of the cooling catheter 120. As depicted, the coupling assembly 123 includes an elongate tubular structure 124, a seal 127, an inflow port 128, and an outflow port 129. The tubular structure 124 is disposed with the bore 136 with a distal end of the tubular structure 124 positioned proximal to the penetrating tip 122. The tubular structure 124 defines a first fluid flow channel 125 and a second fluid flow channel 126. The first fluid flow channel 125 is in fluid communication with the second fluid flow channel 126 at the distal end of the tubular structure 124. The laser fiber 111 is disposed within the first fluid flow channel 125 such that cooling fluid flowing through the first fluid flow channel 125 flows around the laser fiber 111 to absorb heat from and cool the laser fiber 111.

The inflow port 128 is in fluid communication with the first fluid flow channel 125, the outflow port 129 is in fluid communication with the second fluid flow channel 126, and a seal 127 is disposed between the inflow port 128 and the outflow port 129 to prevent cooling fluid from flowing directly from the inflow port 128 to the outflow port 129. Rather, cooling fluid is configured to flow through the inflow port 128, distally through the first fluid flow channel 125, proximally through the second fluid flow channel 126, and through the outflow port 129. The inflow port 128 includes a fitting 137 selectively couplable to a fitting 139 of the inflow tubing 130. The outflow port 129 fitting includes a fitting 138 selectively couplable to a fitting 140 of the outflow tubing 131. The fittings 137, 138 may be female Luer lock fittings and the fittings 139, 140 may be male Luer lock fittings. Other types of fittings are contemplated within the scope of this disclosure.

The inflow tubing 130 extends from the inflow port 128 to the cooling fluid source 134. The cooling fluid source 134 can be any suitable container configured to contain the cooling fluid. For example, the container may be a flexible IV (intravenous) bag. The cooling fluid can include a saline solution (e.g., 0.9% saline solution or normal saline). In some embodiments, the cooling fluid source 134 may include a fluid warmer or cooler such that warmed fluid (e.g., fluid at 37 degrees Centigrade) or cooled fluid (e.g., at or below room temperature) can be pumped through the laser fiber cooling system 100.

The fluid pump 135 is coupled to the inflow tubing 130. In some embodiments, the fluid pump 135 is disposed adjacent the cooling fluid source 134. In other embodiments, the fluid pump 135 is disposed at any point along a length of the inflow tubing 130. The fluid pump 135 can be of any suitable type, such as peristaltic, diaphragm, and piston. Other types of fluid pumps are contemplated. In some embodiments, the fluid pump 135 can be magnetic resonance imaging (MRI) safe such that it can be disposed within the MRI' suite. The fluid pump 135 may be configured to pump the cooling fluid at a rate (but not limited to) ranging from about 8 milliliters per minute to about 20 milliliters per minute or at a nominal flow rate of 80 drops/minute.

In the depicted embodiment of FIG. 1, the outflow tubing 131 extends from the outflow port 129 to the cooling fluid source 134 such that the cooling fluid flows through the laser fiber cooling system 100 in a closed loop. In other words, the cooling fluid flows from the cooling fluid source 134 and is returned to the cooling fluid source 134. In another embodiment, the outflow tubing 131 may extend from the outflow port 129 to a waste container such that the cooling fluid flows from the cooling fluid source 134 to the waste container.

As illustrated in FIG. 1, the first sensor 132 is coupled to the inflow tubing 130 and the second sensor 133 is coupled to the outflow tubing 131. The first and second sensors 132, 133 may be configured to measure a fluid parameter, such as a fluid flow rate and/or a fluid temperature. In certain embodiments, the first sensor 132 and second sensor 133 can include a fluid flow sensor. In other embodiments, the first sensor 132 and second sensor 133 can include a fluid temperature sensor. In still other embodiments, the first sensor 132 and second sensor 133 can include a combination of the fluid flow and fluid temperature sensors to measure the fluid flow rate and the fluid temperature simultaneously and to check fluid flow and verify phase drift in parallel.

The fluid flow sensor may be of any suitable type. For example, the fluid flow sensor can include a mechanical (e.g., turbine, propeller, paddle wheel, etc.), an electromagnetic, and an ultrasonic fluid flow sensor. Other types of fluid flow sensors are contemplated. The fluid temperature sensor may include thermocouples, resistance temperature detector, thermistors, optical sensor, and semiconductor-based integrated circuits. Other types of temperature sensors are contemplated. The first sensor 132 may be disposed anywhere along the length of the inflow tubing 130, the inflow port 128, and the first fluid flow channel 125. The second sensor 133 may be disposed anywhere along a length of the outflow tubing 131, the outflow port 129, and the second fluid flow channel 126. For example, in the depicted embodiment of FIG. 1, the first sensor 132 is disposed adjacent the inflow port 128 and the second sensor 133 is disposed adjacent the outflow port 129.

The first and second sensors 132, 133 can be coupled to the processor 161. The processor 161 can be configured to receive data regarding a fluid parameter from the first and second sensors 132,133 and process the data. For example, the processor 161 may receive fluid flow rate data from the first sensor 132 and fluid flow rate data from the second sensor 133. The processor 161 may then compare the fluid flow rate data from the first sensor 132 with the fluid flow rate data from the second sensor 133 to determine a fluid parameter comparison value. The fluid parameter comparison value is the difference or a ratio of between the inflow fluid parameter and the outflow fluid parameter. If the fluid parameter comparison value is outside a tolerance range, the processor 161 may provide a notification to a user that the laser fiber cooling system 100 has malfunctioned. The processor 161 may include circuitry such as a comparator that compares the difference between or ratio of the flow parameter from the first sensor 132 and the fluid flow parameter from the second sensor 133 to the tolerance range.

Figure 2:
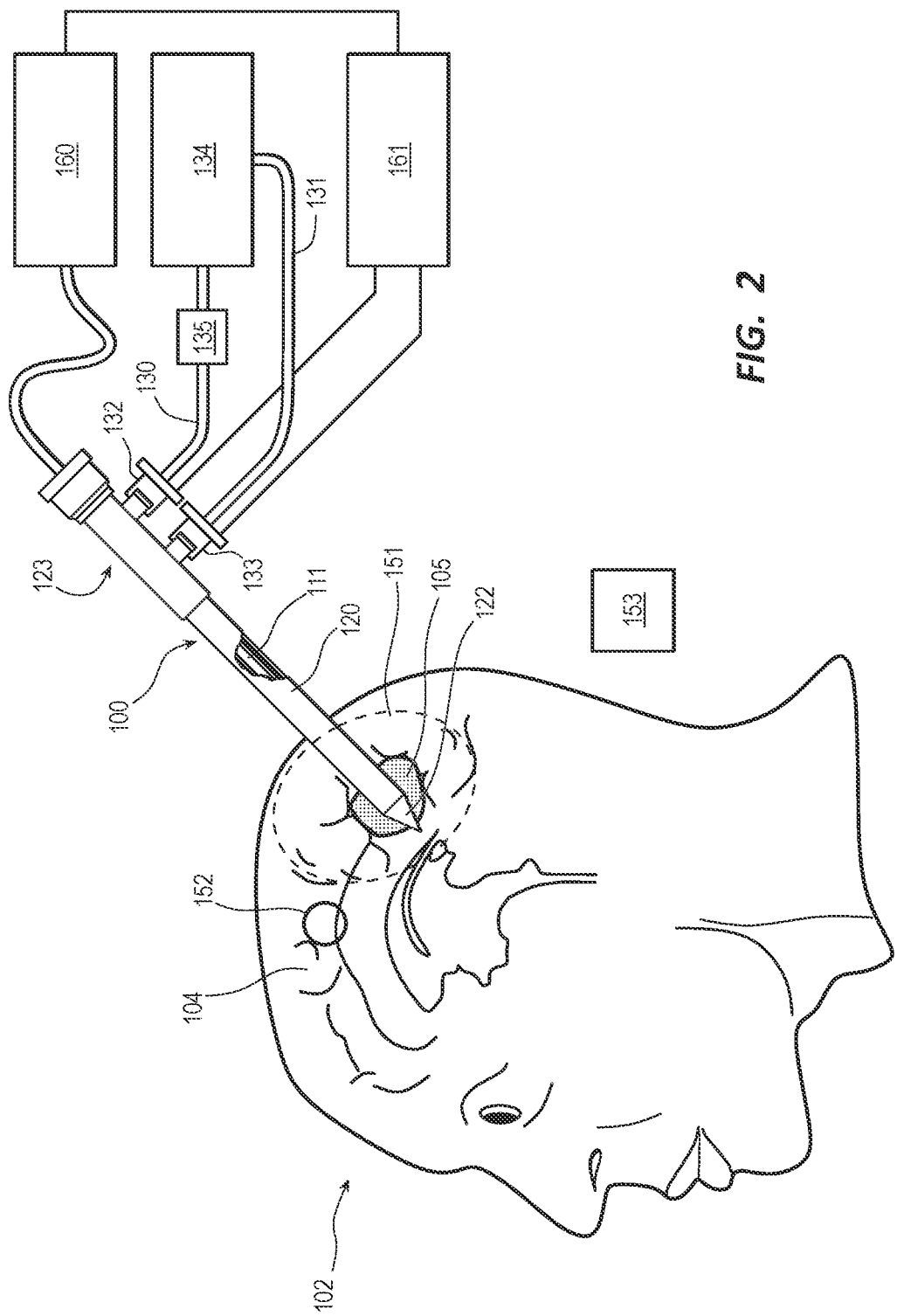
FIG. 2 is a schematic view of a cooling catheter of the laser fiber cooling system of FIG. 1 positioned in laser ablation target tissue.
Figure 3:
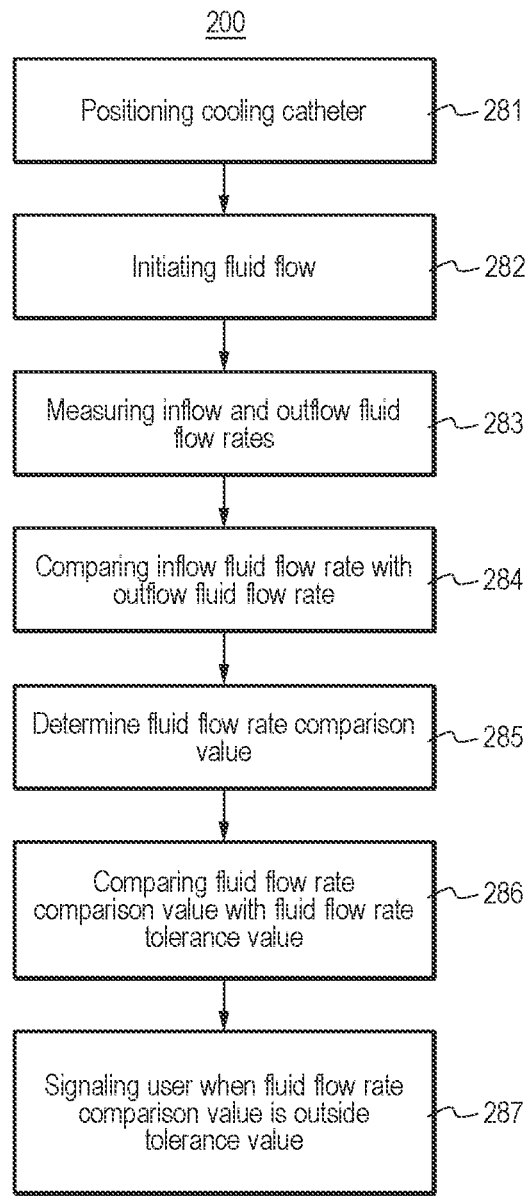
FIG. 3 is a flow chart of steps of a method of checking proper function of the laser fiber cooling system of FIG. 1.

In some embodiments, the laser fiber cooling system 100 can be used to check proper operation of the laser fiber cooling system 100 during a laser ablation procedure and notify the user when there is a malfunction. As shown in FIGS. 2 and 3, a method 200 of checking proper operation of the laser fiber cooling system 100 includes positioning 281 the cooling catheter 120 within a laser ablation target tissue 105. The step of initiating fluid flow 282 can include activating the fluid pump 135 such that cooling fluid flows from the cooling fluid source 134, through the inflow tubing 130, coupling assembly 123, cooling catheter 120, and outflow tubing 131, and into the cooling fluid source 134 or waste container. Activation of the fluid pump 135 can include setting a fluid flow rate dependent upon output level (e.g., low, medium, or high) of the laser fiber 111.

The method 200 further includes measuring an inflow fluid flow rate 283 by the first sensor 132 and measuring an outflow fluid flow rate 283 by the second sensor 133, comparing the measured flow rates 284 and determining a fluid flow rate comparison value 285 by the processor 161, comparing the fluid flow rate comparison value with a fluid flow rate tolerance range 286, and signaling the user when the fluid flow rate comparison value is outside of the fluid flow rate tolerance range 287 by the processor 161 indicating a malfunction of the laser fiber cooling system 100. The fluid flow rate comparison value is the difference between or a ratio of the inflow fluid flow rate and the outflow fluid flow rate. The fluid flow rate comparison value may be influenced by friction acting to slow fluid flow as the fluid flows through the cooling catheter 120, length and diameter of the inflow and outflow tubings 130,131, characteristics of the cooling fluid, and other components of the cooling system 100. Signaling the user may include any suitable signal, such as an on-screen symbol, notification, or icon, a sound from a speaker, a vibration, etc.

In another embodiment, a volume of the cooling fluid source 134 may be monitored as a surrogate indicator of proper operation of the laser fiber cooling system 100. In other words, a start of procedure volume of the cooling fluid source 134 may be compared with an end of procedure volume or a volume during the procedure. In some embodiments, continuous measurement of a coolant return volume during a procedure may assist in indicating normal functioning of the system. The continuous measurement of the coolant return may be used by the system to inform the user when the procedure is underway and when the coolant return volume is not as expected. For example, an alert can be generated when the coolant return volume is not as expected. In some embodiments when the coolant is disposed into a waste container from outflow tubing 131, disposed volume of the coolant can be measured (e.g., actual outflowed volume at a given time instant during the progress of the therapy) and compared with the expected volume of coolant. A difference in the measured volumes (e.g., expected versus actual) may indicate a malfunction of the laser fiber cooling system 100.

The malfunction may include a kink, an occlusion, a restriction, a disconnection, a breakage, fluid source depletion, a pump failure, etc. For example, if a kink restricts fluid flow through the laser fiber cooling system 100, the outflow fluid flow rate may be less than the inflow fluid flow rate. In some embodiments, when the laser fiber cooling system 100 is occluded, the inflow fluid flow rate and the outflow fluid flow rate may be substantially zero. The comparison of the inflow and outflow fluid rates may determine a fluid flow rate comparison value that exceeds a tolerance range because a difference between or a ratio of the inflow fluid flow rate and the outflow fluid flow rate is larger than expected. Malfunction of the laser fiber cooling system 100 can result in hyperthermia of non-diseased tissue. Hyperthermia of non-diseased tissue may cause undesired patient morbidities, such as compromising of neural functions, seizures, excessive neural edema, etc.

In other embodiments, the processor 161 may control a laser energy source 160 to decrease laser energy output, increase the laser energy output, suspend, or terminate the laser energy output when the fluid flow rate comparison value exceeds or deviates from the fluid flow rate tolerance range. In some embodiments, the processor 161 may signal or notify the user when the fluid flow rate comparison value exceeds a first fluid flow rate tolerance range and terminate laser output when the fluid flow rate comparison value exceeds a second fluid flow rate tolerance range.

Figure 4:
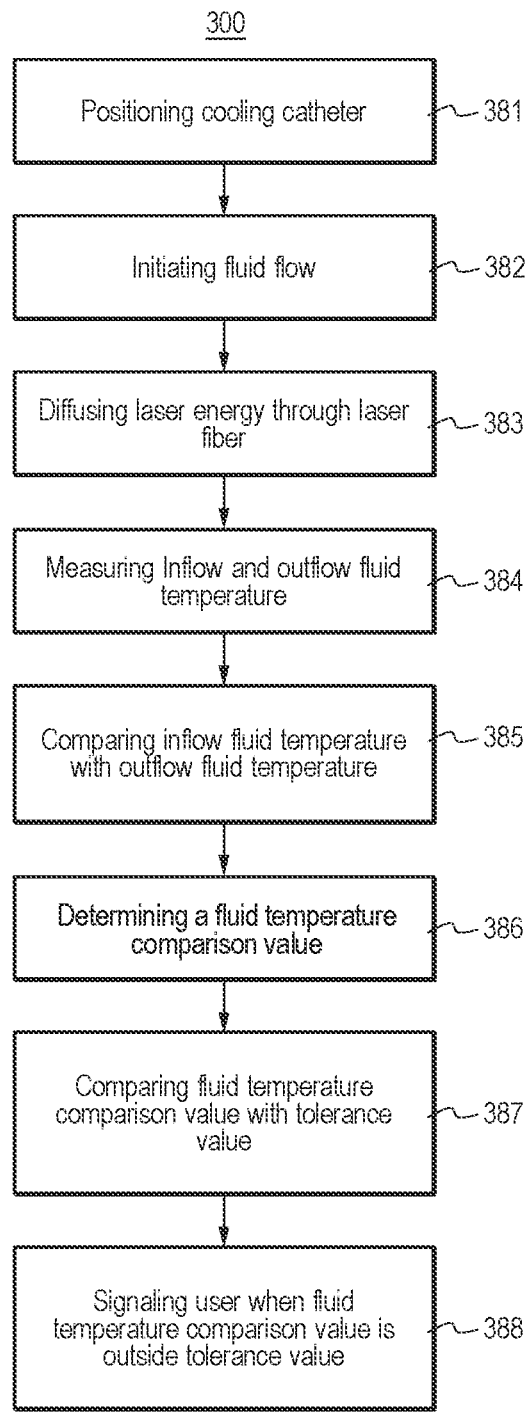
FIG. 4 is a flow chart of steps of a method of verifying a magnetic field phase drift.

Additionally, or alternatively, the laser fiber cooling system 100 can be used to verify a phase drift of a static magnetic field. As shown in FIGS. 2, and 4, a method of verifying a phase drift of a static magnetic field during a laser ablation procedure or a test procedure 300 includes positioning 381 the cooling catheter 120 within the laser ablation target tissue 105 and initiating fluid flow 382 through the laser fiber cooling system 100. The step of initiating fluid flow 382 can include activating the fluid pump 135 such that cooling fluid flows from the cooling fluid source 134, through the inflow tubing 130, inflow port 128, and first channel 125 and around the laser fiber 111, second channel 126, outflow port 129, and outflow tubing 131, and into the cooling fluid source 134 or waste container. As the cooling fluid flows around the laser fiber 111, heat from the laser fiber 111 can transfer to the cooling fluid resulting in cooling of the laser fiber 111 and an increase in temperature of the cooling fluid. In some embodiments, activation of the fluid pump 135 can include setting a fluid flow rate dependent upon output level (e.g., low, medium, or high) of the laser fiber 111.

In other embodiments, the inflow fluid temperature measured by the first sensor can be compared with a temperature of a static reference marker inferred by MR thermometry. Ratios of the temperature values prior to treatment and during treatment can be compared. If comparison values are outside of a tolerance range, the processor can notify the user of a potential magnetic phase drift.

The method 300 further includes diffusing laser energy 383 from the laser fiber 111 into the ablation target tissue 105, measuring an inflow fluid temperature 384 by the first sensor 132 and measuring an outflow fluid temperature 384 by the second sensor 133, comparing the inflow fluid temperature with the outflow fluid temperature 385 by the processor 161, determining a fluid temperature comparison value 386 by the processor 161, comparing the fluid temperature comparison value with a temperature tolerance range around an expected value 387, and signaling the user when the fluid temperature comparison value is outside of the fluid temperature tolerance range 388 by the processor 161 indicating that the phase drift has occurred. The fluid temperature comparison value is the difference between or a ratio of the inflow fluid temperature and the outflow fluid temperature.

In some embodiments, signaling the user may include any suitable signal, such as an on-screen symbol, notification, or icon, a sound from a speaker, a vibration, etc. In other embodiments, the processor 161 may control a laser energy source 160 to decrease laser energy output, increase the laser energy output, or pause the delivery of therapy until the reference markers are reset (or in some cases reset the temperature reference markers), or terminate the laser energy output when the fluid flow rate comparison value exceeds or deviates from the fluid flow rate tolerance range. In some embodiments, the processor 161 may signal or notify the user when the fluid temperature comparison value exceeds a first fluid temperature tolerance range and terminate laser output when the fluid flow rate comparison value exceeds a second fluid flow rate tolerance range. The fluid temperature expected value may be based on a temperature map (T-map) derived from proton resonance frequency shift MR imaging. Temperature fields of the T-map can be obtained by phase shift which is measuring the phase difference due to the resonance frequency variation occurring when the temperature is modified from a known baseline reference phase. For example, a system may use a heat transfer function that uses temperatures from the T-map and other environmental factors, such as intensity of laser energy, coolant type, flow rate, diameter and length of the cooling catheter 120, proximity of the cooling catheter 120 to flowing cerebral spinal fluid or blood, density of tissue surrounding the cooling catheter 120, fat, white brain matter, grey brain matter, etc. to calculate the expected difference between the input and output temperatures.

An environment surrounding the cooling catheter 120 may act as a heat sink to draw off heat from the laser fiber cooling system 100 at different rates. A tolerance range may be configured around the calculated expected temperature difference. The calculated expected temperature difference is defined as a variability over time of a temperature invariant reference marker whose temperature is inferred by MR thermometry. The tolerance range may be influenced by laser power (e.g., low, medium or high chosen for a specific ablation), number of pull back iterations and duration of treatment. If the measured temperature is outside of the expected tolerance range, the system may determine or verify that phase drift may have occurred.

The method 300 can be executed at any time point or at multiple points during the laser ablation procedure. In other embodiments, the processor 161 may control the laser energy source 160 to decrease laser energy output, increase the laser energy output, suspend, or terminate the laser energy output when the fluid temperature comparison value is outside the fluid temperature tolerance range.

In some embodiments, after each laser exposure, the ablation treated tissue may be allowed to cool back to a baseline temperature before resetting the phase reference (e.g., of a specific temperature invariant reference marker). The fluid temperature difference may be used as a surrogate indicator to ascertain if the ablation treated tissue has cooled to the baseline temperature. In some embodiments, the fluid pump 135 remains activated throughout the fluid thermal monitoring period.

In some embodiments, the method 300 may further include acquiring a first inferred temperature of a reference marker 152 using MR thermometry at a first point in time and a second inferred temperature of the reference marker 152 at a second point in time after the first point in time or resetting the reference marker 152 to a baseline temperature reference. The reference marker is substantially temperature invariant or independent. For example, acquisition of the first inferred temperature may occur as a baseline inferred temperature prior to start of the laser ablation procedure and acquisition of the second inferred temperature may occur from about two to about 10 minutes following the start of the laser ablation procedure. The reference marker 152 may be disposed a distance away from the laser ablation target tissue 105 but within a MR thermometry field of view 151 such that the reference marker 152 is not heated by the laser light energy diffused from the diffusing tip 112 during the laser ablation procedure and an actual temperature of the reference marker 152 remains substantially constant over a duration of the laser ablation procedure. For example, the reference marker 152 can be disposed on the opposite hemisphere of a brain 104. In certain embodiments, more than one reference marker 152 may be utilized. For example, two, three, or more reference markers 152 may be used to avoid single reference marker measurement noise error. In another embodiment, a temperature phantom 153 can be disposed external or internal (e.g., embedded in an anchor used to guide the laser fiber through a burr hole) to a patient 102 but within the MR thermometry field of view 151 (for example, in a bone anchor used to guide the laser fiber 111). The temperature phantom 153 can be configured to maintain a controlled temperature over the duration of the laser ablation procedure. The temperature phantom 153 may be MR safe to be disposed within the MR suite.

The first and second inferred temperatures may be compared to determine a magnetic field phase drift value over an interval of time. If the magnetic field phase drift value and/or rate is greater than two degrees Centigrade over 10 minutes, the magnetic field phase drift has been detected and can be verified using the method 300 described above. When the magnetic field phase drift has been verified, a third inferred temperature of the reference marker 152 and/or inferred and/or measured temperature value of the phantom 153 can be acquired to establish a new baseline inferred temperature. In some examples the new baseline temperature could be reset to a first inferred baseline temperature.

The magnetic field phase drift may cause an over or under estimation of the temperature of the laser ablation target tissue. An over estimation of the temperature may result in thermal necrosis of less diseased tissue than desired, and an under estimation of the temperature may result in thermal necrosis of healthy tissue beyond a margin of the diseased tissue.

In certain embodiments, when a phase drift is detected, the phase reference markers 152 may be reset (to equal an earlier inferred measurement), MRI reference phase data (e.g., from proton resonant frequency) may be reacquired, and/or the laser ablation procedure may be suspended or aborted.

In another embodiment, the fluid pump 135 may be activated to pump cooling fluid without turning on the laser energy source 160. No heat transfer would take place and a baseline phase drift behavior of the MRI static magnetic field could be estimated. A phase drift can be observed as the inferred temperature values of the reference markers 152 changes over time. For example, if the inferred temperature values of the phase reference markers 152 change without any change in measured fluid inflow and outflow temperatures a phase drift of the MRI static magnetic field may be deduced. Based on this a time interval interlock may be set beyond which the system will notify the user to verify and reset the phase reference markers 152 or reacquire the MRI phase data after continuous thermal monitoring.

In some embodiments, the position and function of the laser fiber 111 can be confirmed by applying a test pulse from the laser energy source 160 to the laser fiber 111 at a low power level for a short duration (for example, 15% of a maximum recommended power level for 30 seconds or less) until a temperature increase of the outflowing cooling fluid is measured to confirm the position and function of the laser fiber 111. If the rise in temperature is not measured, the laser energy source 160 can be turned off and the user notified. In some embodiments, the outflow fluid flow rate and increase in return volume of the cooling fluid may be used as indicators of position and function of the laser fiber 111.

Figure 5A:
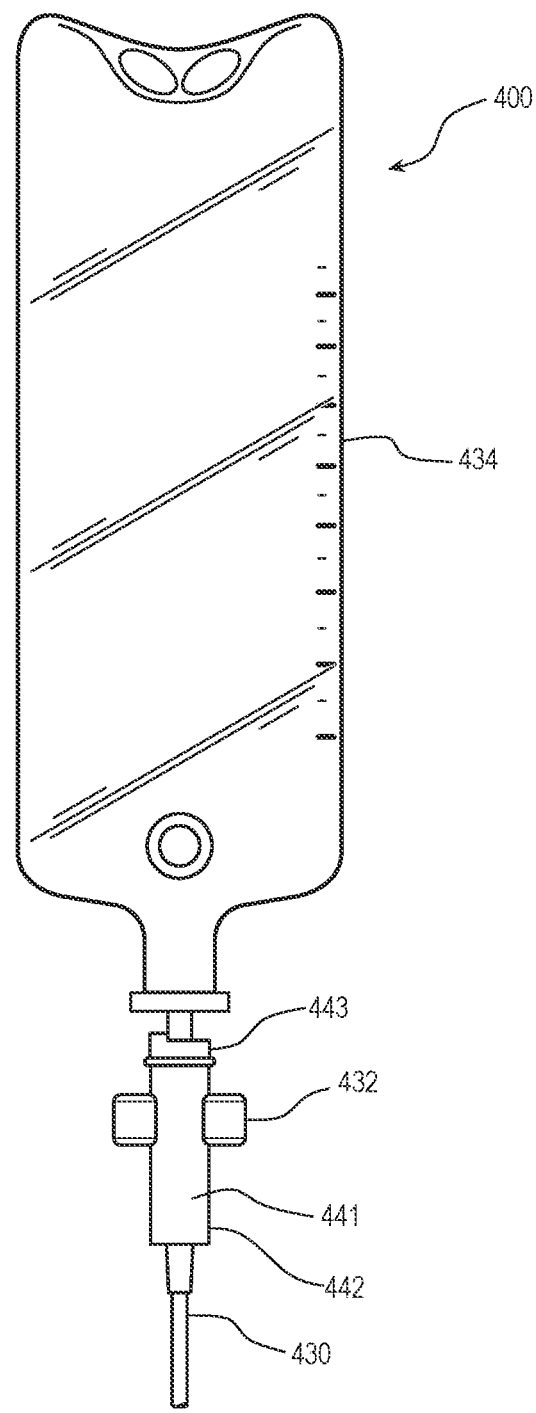
FIG. 5A is a front elevation view of a fluid flow sensor, according to one embodiment.
Figure 5B:
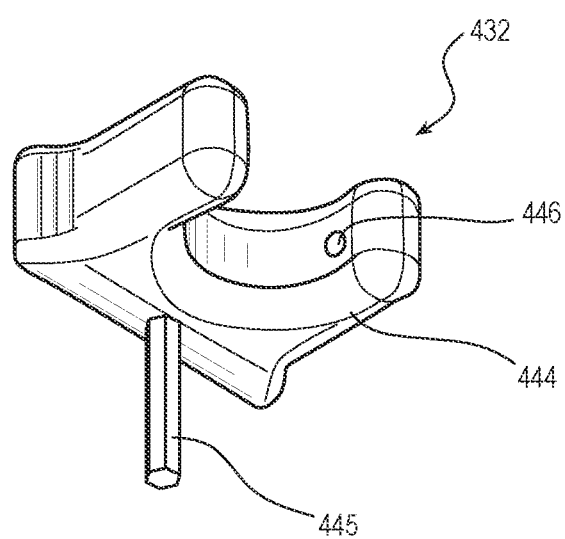
FIG. 5B is an isometric view of the fluid flow sensor of FIG. 5A, according to one embodiment.

FIGS. 5A and 5B depict an embodiment of a laser fiber cooling system 400 that resembles the laser fiber cooling system 100 described above in certain respects. Accordingly, like features are designated with like reference numerals, with the leading digit incremented to "4." For example, the embodiment depicted in FIGS. 5A and 5B includes a first sensor 432 that may, in some respects, resemble the first sensor 132 of FIG. 1. Relevant disclosure set forth above regarding similarly identified features thus may not be repeated hereafter. Moreover, specific features of the laser fiber cooling system 100 and related components shown in FIGS. 1-4 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the laser fiber cooling system 400 and related components depicted in FIGS. 5A and 5B. Any suitable combination of the features, and variations of the same, described with respect to the laser fiber cooling system 100 and related components illustrated in FIGS. 1-4 can be employed with the laser fiber cooling system 400 and related components of FIGS. 5A and 5B, and vice versa. This pattern of disclosure applies equally to further embodiments depicted in subsequent figures and described hereafter, wherein the leading digits may be further incremented.

FIGS. 5A and 5B illustrate an embodiment of a first sensor 432 configured to measure a fluid flow rate of a laser fiber cooling system by counting a rate of fluid drops falling into a drip chamber from a fluid source. The depicted first sensor 432 is configured to measure an inflow fluid flow rate. In another embodiment, a similar first sensor 432 may be configured to measure an outflow fluid flow rate by counting a rate of fluid drops falling into a drip chamber as cooling fluid is returned from a cooling catheter. As depicted in FIG. 5A, the first sensor 432 is coupled to a drip chamber 441. The drip chamber 441 is coupled to and in fluid communication with a cooling fluid source 434. An inflow tubing 430 extends from the drip chamber 441. The cooling fluid source 434 can be any suitable container configured to contain the cooling fluid. For example, as illustrated, the container may be a flexible intravenous (IV) bag. The drip chamber 441 includes a chamber portion 442 and a chamber cover 443 coupled to a top of the chamber portion 442. The chamber cover 443 may include a drop port configured to form fluid drops having volumes of 10 drop/milliliter, 15 drop/milliliter, 20 drop/milliliter, or 60 drop/milliliter. Other drop volumes are contemplated within the scope of this disclosure. The material of the chamber portion 442 is clear or transparent to allow visualization of the fluid drops as they fall from the drop port into the chamber portion 442.

As illustrated in FIG. 5B, the first sensor 432 includes a housing 444 configured to couple with the chamber portion 442. A break-beam sensor 446 is disposed within the housing 444 and configured to detect the fluid drops that fall from the drop port. A cable 445 coupled to the break-beam sensor 446 extends from the housing 444 and is configured to transmit drop rates from the first sensor 432 to a processor. The processor may utilize the drop rates or convert the drop rates into a fluid flow rate to monitor a status of a laser fiber cooling system, as previously described. Additionally, the flow rate may be sent to a display to allow a user to view the flow rate measurements of both the outgoing flow and the return flow.

For example, when the drip chamber 441 includes a 20 drop/milliliter and the first sensor 432 detects a drop rate of 60 drops per minute, the processor may calculate a fluid flow rate of three milliliters per minute. A decrease in the inflow and/or the outflow detected drop rate, or the fluid flow rate may indicate a malfunction of the laser fiber cooling system. In certain embodiments, a comparison of the inflow and outflow detected drop rates or fluid flow rates may be made by the processor. When a difference is detected, a malfunction of the laser fiber cooling system may be indicated.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. For example, a method of laser ablation therapy may include one or more of the following steps: initiating fluid flow through a fluid flow path, wherein a laser fiber is in contact with the flowing fluid along a length of the laser fiber; measuring a parameter of the fluid prior to contact with the laser fiber to determine a first parameter value; measuring the parameter of the fluid after contact with the laser fiber to determine a second parameter value; comparing the first parameter value to the second parameter value to obtain a parameter comparison value; determining if the parameter comparison value is outside a tolerance range; and signaling a user when the parameter comparison value is outside the tolerance range. Other steps are also contemplated.

The phrases "coupled to" and "in communication with" refer to any form of interaction between two or more entities, including mechanical, electrical, magnetic, optic, electromagnetic, fluid, and thermal interaction. Two components may be coupled to or in communication with each other even though they are not in direct contact with each other. For example, two components may be coupled to or in communication with each other through an intermediate component.

The directional terms "distal" and "proximal" are given their ordinary meaning in the art. That is, the distal end of a medical device means the end of the device furthest from the practitioner during use. The proximal end refers to the opposite end, or the end nearest to the practitioner during use.

"Fluid" is used in its broadest sense, to refer to any fluid, including both liquids and gases as well as solutions, compounds, suspensions, etc., which generally behave as fluids.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially constant" is recited with respect to a feature, it is understood that in further embodiments, the feature can have a precisely constant configuration.

The terms "a" and "an" can be described as one, but not limited to one. For example, although the disclosure may recite a catheter having "a bore," the disclosure also contemplates that the catheter can have two or more bores.

Unless otherwise stated, all ranges include both endpoints and all numbers between the endpoints.

Recitation in the claims of the term "first" with respect to a feature or element does not necessarily imply the existence of a second or additional such feature or element.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A laser fiber cooling monitoring system, comprising:
   a cooling catheter extending a length from a proximal end of the cooling catheter to a distal end of the cooling catheter, the cooling catheter comprising:
      an inflow port disposed adjacent the proximal end;
      an outflow port disposed adjacent the proximal end; and
      a fluid flow path comprising a first fluid flow channel extending from the inflow port to a point inside the cooling catheter adjacent the distal end and a second fluid flow channel extending from the point inside the cooling catheter adjacent the distal end to the outflow port;
   a cooling fluid source comprising a container that contains a cooling fluid;
   an inflow channel arranged in fluid communication with the cooling fluid source, the inflow port, and the first fluid flow channel;
   an outflow channel arranged in fluid communication with the outflow port and the second fluid flow channel;
   a first sensor arranged at a point along a length of the inflow channel between the inflow port and the cooling fluid source, wherein the first sensor measures a parameter of a fluid within the inflow channel;
   a second sensor arranged at a point along a length of the outflow channel outside of the cooling catheter, wherein the second sensor measures the parameter of the fluid within the outflow channel;
   wherein at least one of the first sensor and the second sensor comprise a break-beam sensor that counts drops in a respective drip chamber; and
   a processor to:
      receive inflow data comprising the parameter of the fluid within the inflow channel measured by the first sensor;
      receive outflow data comprising the parameter of the fluid within the outflow channel measured by the second sensor;
      compare the inflow data to the outflow data to determine a parameter comparison value;
      determine whether the parameter comparison value is outside of a tolerance range; and
      cause, when the parameter comparison value is determined to be outside of the tolerance range, a signal to be output by at least one of a display and a speaker that notifies a user of a fluid flow restriction or a malfunction of the laser fiber cooling monitoring system.

2. The laser fiber cooling monitoring system of claim 1, wherein the parameter is a fluid flow rate.

3. The laser fiber cooling monitoring system of claim 1, wherein the parameter comparison value is a difference between an inflow fluid flow rate for the inflow channel and an outflow fluid flow rate for the outflow channel.

4. The laser fiber cooling monitoring system of claim 1, wherein the processor determines, based on the parameter comparison value, an occurrence of a phase drift of a magnetic field during a laser ablation procedure.

5. The laser fiber cooling monitoring system of claim 1, wherein the tolerance range is greater than 0.1 milliliters per minute.

6. The laser fiber cooling monitoring system of claim 1, wherein the first sensor comprises a first break-beam sensor configured to count drops in an inflow drip chamber, and wherein the inflow drip chamber is arranged adjacent the cooling fluid source.

7. The laser fiber cooling monitoring system of claim 1, further comprising a fluid pump configured to pump the that pumps fluid from the cooling fluid source into the inflow channel and through the fluid flow path.

8. The laser fiber cooling monitoring system of claim 1, wherein the cooling fluid source comprises an intravenous (IV) bag of saline.

9. The laser fiber cooling monitoring system of claim 1, wherein the first sensor comprises at least one of a first fluid flow sensor and a first temperature sensor, wherein the second sensor comprises at least one of a second fluid flow sensor and a second temperature sensor, wherein the inflow data comprises a first temperature and a first flow rate of the fluid within the inflow channel, wherein the outflow data comprises a second temperature and a second flow rate of the fluid within the outflow channel, and wherein the parameter comparison value is based on the first temperature, the second temperature, the first flow rate, and the second flow rate.

10. The laser fiber cooling monitoring system of claim 1, wherein the processor is configured to control a laser energy source, and wherein the processor is configured to:
decrease, when the parameter comparison value is determined to be outside of the tolerance range, laser energy output from the laser energy source.

11. A method of laser ablation therapy, comprising:
providing a laser fiber cooling monitoring system, comprising:
  a cooling catheter extending a length from a proximal end of the cooling catheter to a distal end of the cooling catheter, the cooling catheter comprising:
    an inflow port disposed adjacent the proximal end;
    an outflow port disposed adjacent the proximal end; and
    a fluid flow path comprising a first fluid flow channel extending from the inflow port to a point inside the cooling catheter adjacent the distal end and a second fluid flow channel extending from the point inside the cooling catheter adjacent the distal end to the outflow port;
  a cooling fluid source comprising a container that contains a cooling fluid;
  an inflow channel arranged in fluid communication with the cooling fluid source, the inflow port, and the first fluid flow channel;
  an outflow channel arranged in fluid communication with the outflow port and the second fluid flow channel;
  a first sensor arranged at a point along a length of the inflow channel between the inflow port and the cooling fluid source, wherein the first sensor measures a parameter of a fluid within the inflow channel; and
  a second sensor arranged at a point along a length of the outflow channel outside of the cooling catheter, wherein the second sensor measures the parameter of the fluid within the outflow channel;
  wherein at least one of the first sensor and the second sensor comprise a break-beam sensor that counts drops in a respective drip chamber;
initiating a flow of the cooling fluid from the cooling fluid source through the fluid flow path, wherein a laser fiber is arranged in contact with a portion of the cooling fluid flowing along a length of the laser fiber in the fluid flow path;
receiving, from the first sensor, a first parameter value comprising the parameter of the fluid within the inflow channel prior to flowing along the length of the laser fiber in the fluid flow path;
receiving, from the second sensor, a second parameter value comprising the parameter of the fluid within the outflow channel after flowing along the length of the laser fiber in the fluid flow path;
comparing, by a processor, the first parameter value to the second parameter value to obtain a parameter comparison value;
determining, by the processor, whether parameter comparison value is outside a tolerance range; and
causing, by the processor when the parameter comparison value is determined to be outside of the tolerance range, a signal to be output by at least one of a display and a speaker that notifies a user of a fluid flow restriction or a malfunction of the laser fiber cooling monitoring system.

12. The method of claim 11, wherein the parameter is a fluid flow rate.

13. The method of claim 11, wherein the parameter comparison value is a difference between an inflow fluid flow rate for the inflow channel and an outflow fluid flow rate for the outflow channel.

14. The method of claim 11, wherein the first sensor comprises a first break-beam sensor configured to count drops in an inflow drip chamber, and wherein the inflow drip chamber is arranged adjacent the cooling fluid source.

15. The method of claim 11, further comprising:
controlling, by the processor when the parameter comparison value is determined to be outside the tolerance range, a laser energy source operatively connected with the laser fiber to
decrease laser energy output from the laser energy source.

16. The method of claim 11, further comprising:
controlling, by the processor when the parameter comparison value is determined to be outside the tolerance range, a laser energy source operatively connected with the laser fiber to increase a laser energy output from the laser energy source.

17. The method of claim 11, wherein the first sensor comprises at least one of a first fluid flow sensor and a first temperature sensor, wherein the second sensor comprises at least one of a second fluid flow sensor and a second temperature sensor, wherein the first parameter value comprises a first temperature and a first flow rate of the fluid within the inflow channel, wherein the second parameter value comprises a second temperature and a second flow rate of the fluid within the outflow channel, and wherein the parameter comparison value is based on the first temperature, the second temperature, the first flow rate, and the second flow rate.

18. A laser fiber cooling monitoring system, comprising:
a cooling fluid source comprising a container that contains a cooling fluid;
an inflow channel extending from the cooling fluid source to an inflow port of a cooling catheter, wherein the inflow channel is arranged in fluid communication with the cooling fluid source and the inflow port of the cooling catheter;
an outflow channel extending from an outflow port of the cooling catheter to the cooling fluid source, wherein the outflow channel is arranged in fluid communication with the outflow port and the cooling fluid source;
a first sensor arranged at a point along a length of the inflow channel between the inflow port of the cooling catheter and the cooling fluid source, wherein the first sensor comprises at least one of a first fluid flow sensor and a first temperature sensor, and wherein the first sensor measures a parameter of a fluid within the inflow channel;
a second sensor arranged at a point along a length of the outflow channel between the outflow port of the cooling catheter and the cooling fluid source, wherein the second sensor comprises at least one of a second fluid flow sensor and a second temperature sensor, and wherein the second sensor measures the parameter of the fluid within the outflow channel;
wherein at least one of the first sensor and the second sensor comprise a break-beam sensor that counts drops in a respective drip chamber; and a processor to:
receive inflow data comprising the parameter of the fluid within the inflow channel measured by the first sensor, wherein the inflow data comprises a first temperature and a first flow rate of the fluid within the inflow channel;
receive outflow data comprising the parameter of the fluid within the outflow channel measured by the second sensor, wherein the outflow data comprises a second temperature and a second flow rate of the fluid within the outflow channel;
compare the inflow data to the outflow data to determine a parameter comparison value that is based on the first temperature, the second temperature, the first flow rate, and the second flow rate;
determine whether the parameter comparison value is outside of a tolerance range; and
cause, when the parameter comparison value is determined to be outside of the tolerance range, a signal to be output by at least one of a display and a speaker that notifies a user of a fluid flow restriction or a malfunction of the laser fiber cooling monitoring system.

19. The laser fiber cooling monitoring system of claim 18, wherein the first sensor comprises a first break-beam sensor configured to count drops in an inflow drip chamber, and wherein the inflow drip chamber is arranged adjacent the cooling fluid source.

20. The laser fiber cooling monitoring system of claim 18, wherein the processor is configured to control a laser energy source, and wherein the processor is configured to:
decrease laser energy output from the laser energy source when the parameter comparison value is determined to be outside of the tolerance range.

* * * * *